(12) United States Patent
Yamada

(10) Patent No.: US 8,225,080 B2
(45) Date of Patent: Jul. 17, 2012

(54) GRID PROCESSING CONTROL APPARATUS

(75) Inventor: Takuma Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 357 days.

(21) Appl. No.: 12/585,793

(22) Filed: Sep. 24, 2009

(65) Prior Publication Data

US 2010/0017592 A1 Jan. 21, 2010

Related U.S. Application Data

(63) Continuation of application No. PCT/JP2007/056299, filed on Mar. 27, 2007.

(51) Int. Cl.
*G06F 9/00* (2006.01)
*G06F 1/00* (2006.01)
*G06F 15/16* (2006.01)
*G06F 15/177* (2006.01)
*G06F 15/00* (2006.01)
*G06F 9/44* (2006.01)
*G06F 9/445* (2006.01)
*G06F 9/46* (2006.01)

(52) U.S. Cl. .......... 713/1; 713/2; 713/300; 713/324; 709/201; 709/220; 712/28; 717/168; 717/174; 718/100

(58) Field of Classification Search .......... 713/1, 2, 713/300, 324; 709/201, 220; 712/28; 717/168, 717/174; 718/100
See application file for complete search history.

(56) References Cited

U.S. PATENT DOCUMENTS

| | | | | |
|---|---|---|---|---|
| 7,136,924 B2 * | 11/2006 | Dauger | .......... | 709/226 |
| 7,155,550 B2 * | 12/2006 | Katoh et al. | .......... | 710/200 |
| 7,509,644 B2 * | 3/2009 | Worley, Jr. | .......... | 718/104 |
| 7,814,307 B2 * | 10/2010 | Powell et al. | .......... | 713/2 |
| 2004/0226020 A1 * | 11/2004 | Birmingham | .......... | 719/310 |
| 2005/0160423 A1 | 7/2005 | Bantz et al. | | |

FOREIGN PATENT DOCUMENTS

| | | |
|---|---|---|
| JP | 2004-252629 | 9/2004 |
| JP | 2006-113767 | 4/2006 |

OTHER PUBLICATIONS

English Translation of the International Preliminary Report on Patentability mailed Oct. 29, 2009 and issued in corresponding International Patent Application PCT/JP2007/056299.

International Search Report for PCT/JP2007/056299, mailed Jul. 3, 2007.

Yasuhito Takamiya et al., "ORE Grid: A Virtual-machine Based Fast Deployment Tool for Grid Execution Environment", Sep. 2006, vol. 47, No. SIG 12 (ACS 17), pp. 229 to 239.

Michael J. Litzknow et al., "Condor—A Hunter of Idle Workstations", IEEE, 1988, $8^{th}$ International Conference, Jun. 17, 1988, pp. 104-111.

(Continued)

*Primary Examiner* — Stefan Stoynov

(74) *Attorney, Agent, or Firm* — Staas & Halsey LLP

(57) ABSTRACT

According to an aspect of the embodiment, a grid processing control apparatus includes a grid OS being an OS dedicated to grid computing, a general-purpose OS being an OS other than the grid OS, and an OS boot up unit selectively allowing the grid OS or the general-purpose OS to operate. The OS boot up unit allows only the grid OS to operate during grid use term when the grid OS is operated, and allows only the general-purpose OS to operate during general-purpose OS use term when the general-purpose OS is operated.

15 Claims, 6 Drawing Sheets

OTHER PUBLICATIONS

Japanese Office Action issued Apr. 17, 2012 in corresponding Japanese Patent Application No. 2009-506124.

Chinese of Action issued Mar. 12, 2012 in corresponding Chinese Patent Application No. 200780052226.4.

* cited by examiner

GRID PROCESSING CONTROL APPARATUS

CROSS-REFERENCE TO RELATED APPLICATIONS

This is a continuation application of PCT application Ser. No. PCT/JP2007/056299, filed on Mar. 27, 2007.

FIELD

The embodiments discussed herein are related to a grid processing control apparatus.

BACKGROUND

So-called grid computing connects a plurality of computers on a network such as the Internet to establish one computer system. In a computer (an element computer) as an element of a grid, an application program for grid computing (a grid application or a grid AP) is installed and executed.

As an operating environment of the grid application, for example, a configuration illustrated in FIG. 6A is known. A general OS (a general-purpose OS) is operated on a hardware of the element computer, and the grid application and a general-purpose application are operated on the general-purpose OS. The general-purpose OS is an OS generally available on the market such as Windows (registered trademark of Microsoft Corporation) and Linux.

As another operating environment of the grid application, a configuration adopting a multi OS explained below is known (see Patent Document 1). A general-purpose OS (an independent processing OS), an OS of grid computing (a grid dedicated OS), and a grid middleware are operated on a hardware of an element computer. A general-purpose application (an independent processing application) is operated on the independent processing OS. And, a grid AP is operated on the grid dedicated OS and the grid middleware.

Patent Document 1: Japanese Laid-Open Patent Publication No. 2004-252629

In general, in grid computing, there are the following problems concerning security of an element computer.

First, when the element computer of the grid computing is provided as a resource or when the element computer uses other resources (hereinafter, during grid use term), the element computer is easily affected by a health state of a grid computing system. In the element computer, there are cases that the general-purpose OS becomes unstable, that a trouble due to an application or a driver occurs, that a file is destroyed, that the computer gets infected with a virus, and that environment setting changes to an inappropriate state. According to my study, this problem occurs because two group of programs, i.e., a group of the grid (dedicated) OS and the grid application and another group of the general-purpose OS and the general-purpose application simultaneously are operated, during grid use term (in other words, operation is not exclusive).

Second, in the element computer, the grid application is executed in a usual environment of use of a user of the element computer. Therefore, during grid use term, there are risks that the general-purpose OS or the general-purpose application is subjected to system manipulation by a virus, and that a worm or information of the general-purpose application flows out from the element computer. According to my study, this problem occurs because, as illustrated in FIG. 6B, in an element computer (PC) 100, during grid use term, the grid OS is not bound by access restriction to restrict an access to a hard disk (HDD), for example, and because the grid OS is accessible to all circuits.

Third, in the element computer, during grid use term, an execution environment is in the same state as an execution environment (in other words, a normal operation state) of the general-purpose application. Therefore, in some case, the element computer becomes in an operation state at maximum power consumption, so that power consumption cannot be saved. According to my study, as illustrated in FIG. 6B, this problem occurs because power is equally supplied to all the circuits to make the circuits operable, during grid use term, in the element computer 100.

SUMMARY

A low-power-consumption grid processing control apparatus is provided which is less easily affected by a system and for which security is improved.

According to an aspect of the embodiment, a grid processing control apparatus includes a grid OS being an OS dedicated to grid computing; a general-purpose OS being an OS other than the grid OS; and an OS boot up unit selectively allowing the grid OS or the general-purpose OS to operate. The OS boot up unit allows only the grid OS to operate during grid use term when the grid OS is operated, and allows only the general-purpose OS to operate during general-purpose OS use term when the general-purpose OS is operated.

According to another aspect of the embodiment, a grid processing control apparatus further includes a circuit block which includes a grid base circuit corresponding to the grid OS, a general-purpose circuit corresponding to the general-purpose OS, and a basic circuit common to the grid OS and the general-purpose OS. The OS boot up unit supplies power to only the basic circuit and the grid base circuit during grid use term, and supplies the power to the basic circuit, the grid base circuit, and the general-purpose circuit, during general-purpose OS use term.

According to another aspect of the embodiment, a grid processing control apparatus further includes a circuit block including a grid base circuit corresponding to the grid OS, a general-purpose circuit corresponding to the general-purpose OS, and a basic circuit common to the grid OS and the general-purpose OS. The OS boot up unit restricts access to at least a part of the general-purpose circuit by the grid OS during the grid use term, and does not restrict access to the grid base circuit and the general-purpose circuit by the general-purpose OS during the general-purpose OS use term.

According to another aspect of the embodiment, the OS boot up unit restricts access by the grid OS to a HDD included in the general-purpose circuit or to an area used by the general-purpose OS in the HDD during the grid use term.

According to another aspect of the embodiment, the OS boot up unit comprises a BIOS provided in a ROM included in the basic circuit, and, when the a power supply is in a first state, the BIOS boots up the grid OS.

According to another aspect of the embodiment, when the power supply is in a first state, the OS boot up unit boots up the grid OS, and the booted up grid OS executes a grid application. And, when the power supply is in a second state, the OS boot up unit stops the execution of the grid application and finishes the execution of the grid OS, and the OS boot up unit boots up the general-purpose OS after the finish of the execution of the grid OS.

According to another aspect of the embodiment, the booted up grid OS downloads a grid application from a grid service server to which the grid processing control apparatus is connected via a network, and executes the grid application.

According to another aspect of the embodiment, the grid OS saves data of the grid application of which the execution is stopped in a memory provided exclusively for the grid service server or the grid OS.

According to another aspect of the embodiment, the first state of the power supply is decided according to a state of a power switch of the grid processing control apparatus, and the second state of the power supply is decided according to instruction inputted to the grid processing control apparatus or elapse of a time set in advance after the power supply changes to the first state.

According to another aspect of the embodiment, the booted up general-purpose OS executes a general-purpose application, performs suspension processing for the general-purpose OS when the general-purpose OS is in suspension, and finishes the execution of the general-purpose OS when the power supply is in the first state. And, the OS boot up unit boots up the grid OS after the suspension processing or after the finish of the execution of the general-purpose OS.

With the grid processing control apparatus according to the embodiment, the grid processing control apparatus includes the OS boot up unit selectively actuating the grid OS or the general-purpose OS to thereby actuate only the general-purpose OS during the general-purpose OS use term. Consequently, the grid OS and the general-purpose OS are not simultaneously operated, during the grid use term. Therefore, it is possible to prevent the grid processing control apparatus (the element computer) from being affected by a health state of the grid computing system. For example, it is possible to prevent the grid processing control apparatus from being affected in such a way that the general-purpose OS becomes unstable, a trouble due to an application or a driver occurs, a file is destroyed, the apparatus gets infected with a virus, or environment setting changes to an inappropriate state.

According to the embodiment, the OS boot up unit supplies power to only the basic circuit and the grid base circuit during the grid use term, and supplies power to the basic circuit, the grid base circuit, and the general-purpose circuit during the general-purpose OS use term. Consequently, during the grid use term, power is not supplied to all the circuit to make the circuits operable. Therefore, the grid processing control apparatus can save power consumption during the grid use term.

According to the embodiment, the OS boot up unit restricts access to at least a part of the general-purpose circuit by the grid OS during the grid use term, and does not restrict access to the grid base circuit and the general-purpose circuit by the general-purpose OS during the general-purpose OS use term. Consequently, during the grid use term, it is possible to impose access restriction on the grid OS. Therefore, in the grid processing control apparatus, during the grid use term, it is possible to prevent the general-purpose OS and the general-purpose application from being subjected to manipulation by a virus or a worm or prevent information of the general-purpose application from flowing out.

According to the embodiment, during the grid use term, access by the grid OS to the HDD included in the general-purpose circuit or a part of the HDD (the area used by the general-purpose OS) is restricted. Consequently, during the grid use term, it is possible to prevent data stored in the HDD from being manipulated by the grid OS.

According to the embodiment, the BIOS as the OS boot up unit boots up the grid OS when the power supply is in the first state. Consequently, for example, when the first state of the power supply is ON (turn-on) of the power switch, it is possible to immediately boot up the grid OS according to turn-on of the power switch, and boot up execution (grid processing) of the grid application. It is possible to effectively utilize computer resources.

According to the embodiment, the grid OS is booted up when the power supply is in the first state, the execution of the grid application is suspended and the execution of the grid OS is finished when the power supply is in the second state, and the general-purpose OS is booted up after the finish of the execution of the grid OS. Consequently, with a simple configuration, it is possible to switch and selectively execute the grid OS and the general-purpose OS according to a state of the power supply in one-to-one relation.

According to the embodiment, the booted up grid OS downloads the grid application from the grid service server, and executes the grid application. Consequently, the grid service server can immediately boot up, without specially monitoring elements of a grid, the grid processing when the computer as the grid processing control apparatus becomes usable, and can effectively utilize the computer resources.

According to the embodiment, the grid OS saves the data of the execution-suspended grid application in the grid service server or the memory. Consequently, it is possible to store, as a log, data concerning the suspension of the execution of the grid application, and analyze a cause and the like of the suspension.

According to the embodiment, the first state of the power supply is decided according to a state of the power switch of the grid processing control apparatus, and the second state of the power supply is decided according to instruction inputted or elapse of the time set in advance. Consequently, with a simple configuration, it is possible to appropriately associate the state of the power supply with switching of the grid OS and the general-purpose OS, and save power consumption, for example, during the grid use term.

According to the embodiment, the booted up general-purpose OS performs suspension processing for the general-purpose OS when the general-purpose OS is in suspension, terminates the execution of the general-purpose OS when the power supply is in the first state, and boots up the grid OS after the suspension processing or after the termination of the execution of the general-purpose OS. Consequently, with a simple configuration, it is possible to switch and selectively execute the grid OS and the general-purpose OS according to a state of the power supply in a one-to-one relation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

Figure 1:
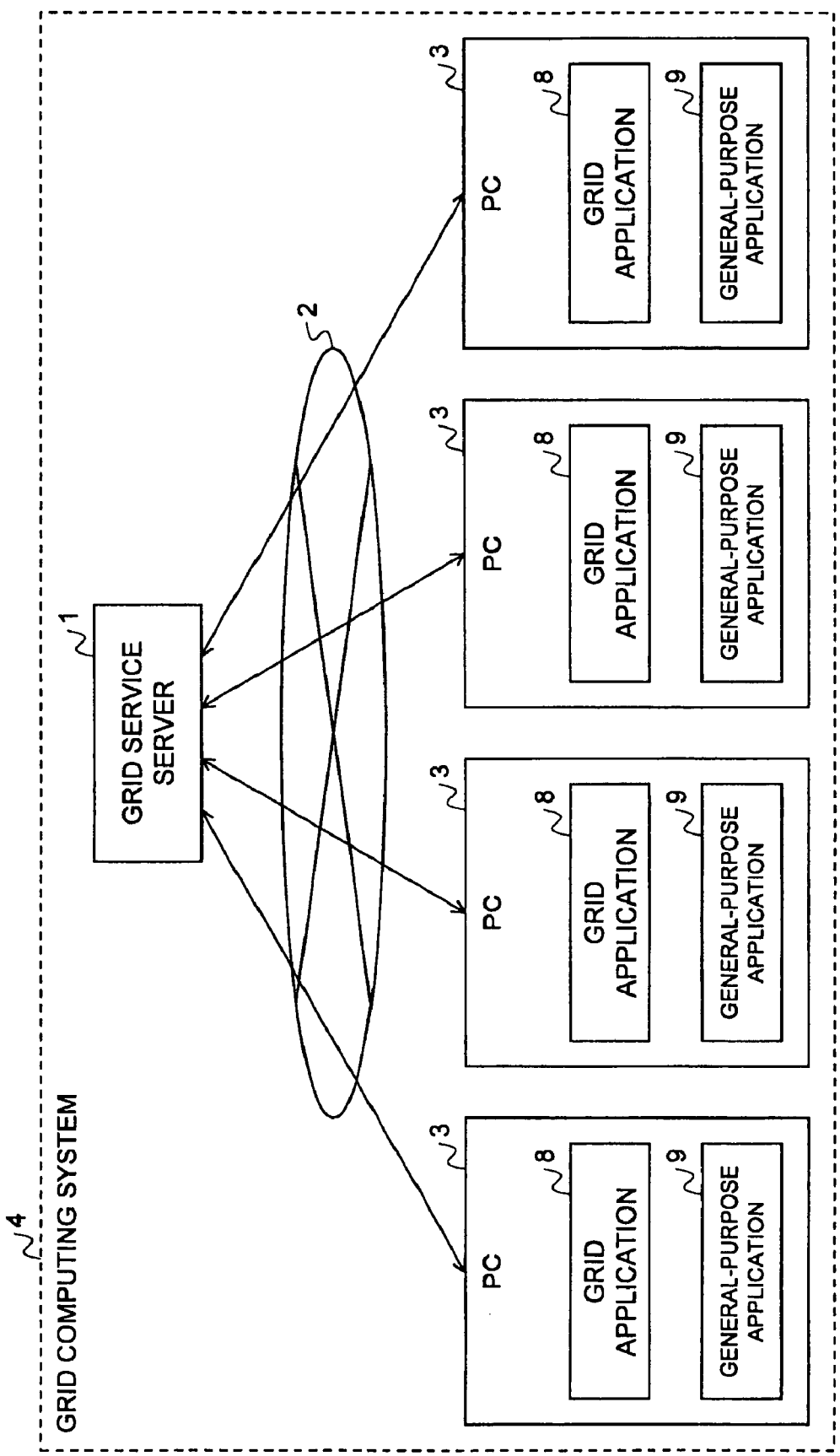
FIG. 1 is a diagram illustrating an example of a configuration of a grid computing system according to the embodiment.

FIG. 1 is a diagram illustrating an example of a configuration of a grid computing system including a grid processing control apparatus according to the embodiment.

A grid computing system 4 includes a grid service server 1, a plurality of computers (element computers) 3 which serve as elements of a grid, and a network 2 which connects the grid service server 1 and the computers 3. The network 2 is the Internet, for example.

The grid service server 1 connects a plurality of element computers 3 on the network 2 to establish one computer system, and provides various services of grid computing such as calculation processing.

The element computers 3 are grid processing control apparatuses 3 according to the embodiment, and are provided as computer resources to the grid computing system 4. The element computers 3 are computers (e.g., personal computers) that use other computer resources of the grid computing system 4. Each of the element computers 3 includes a grid application 8 and a general-purpose application 9.

Figure 2:
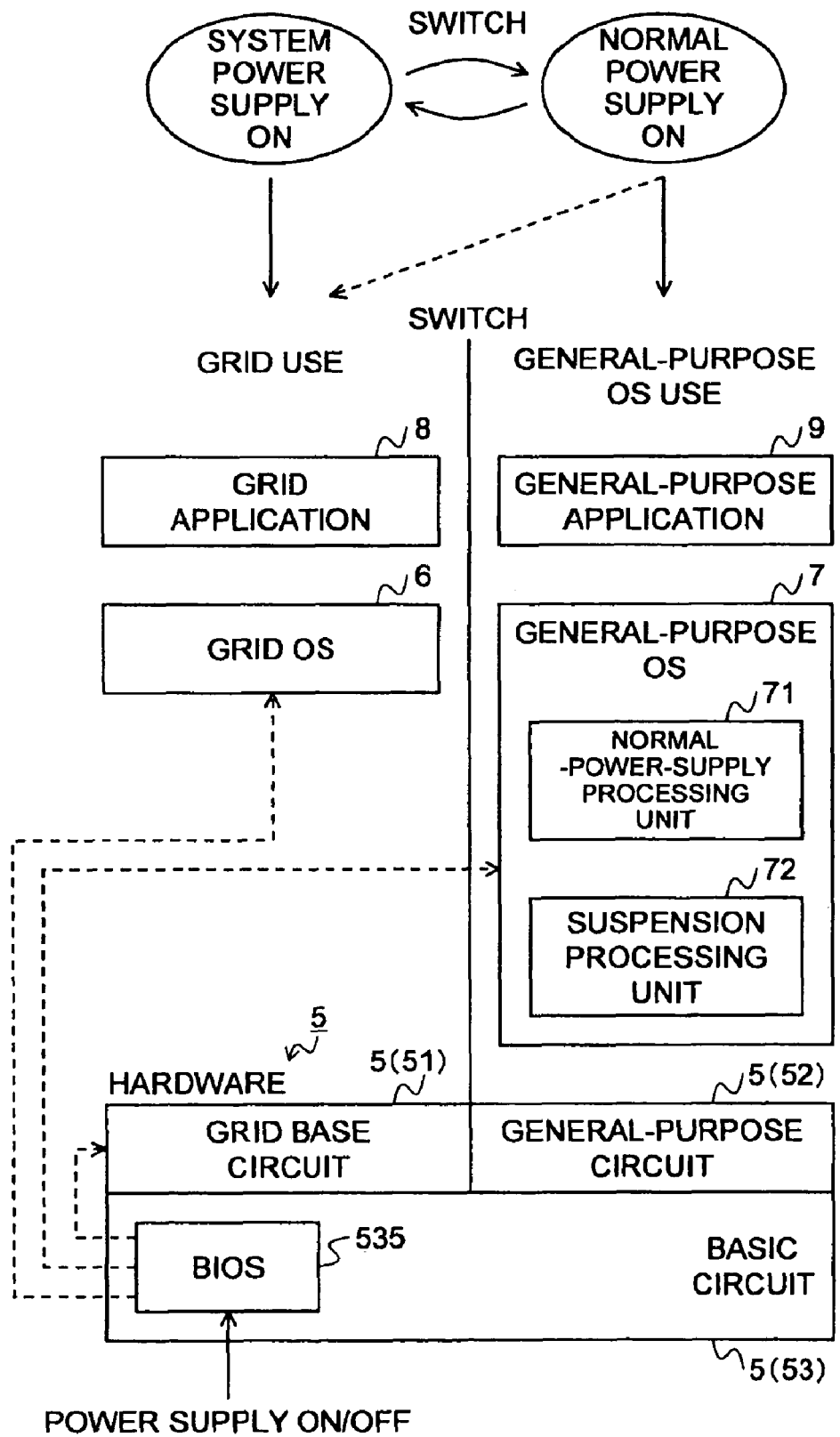
FIG. 2 is a diagram illustrating an example of a configuration of a grid processing control apparatus according to the embodiment.
Figure 3:
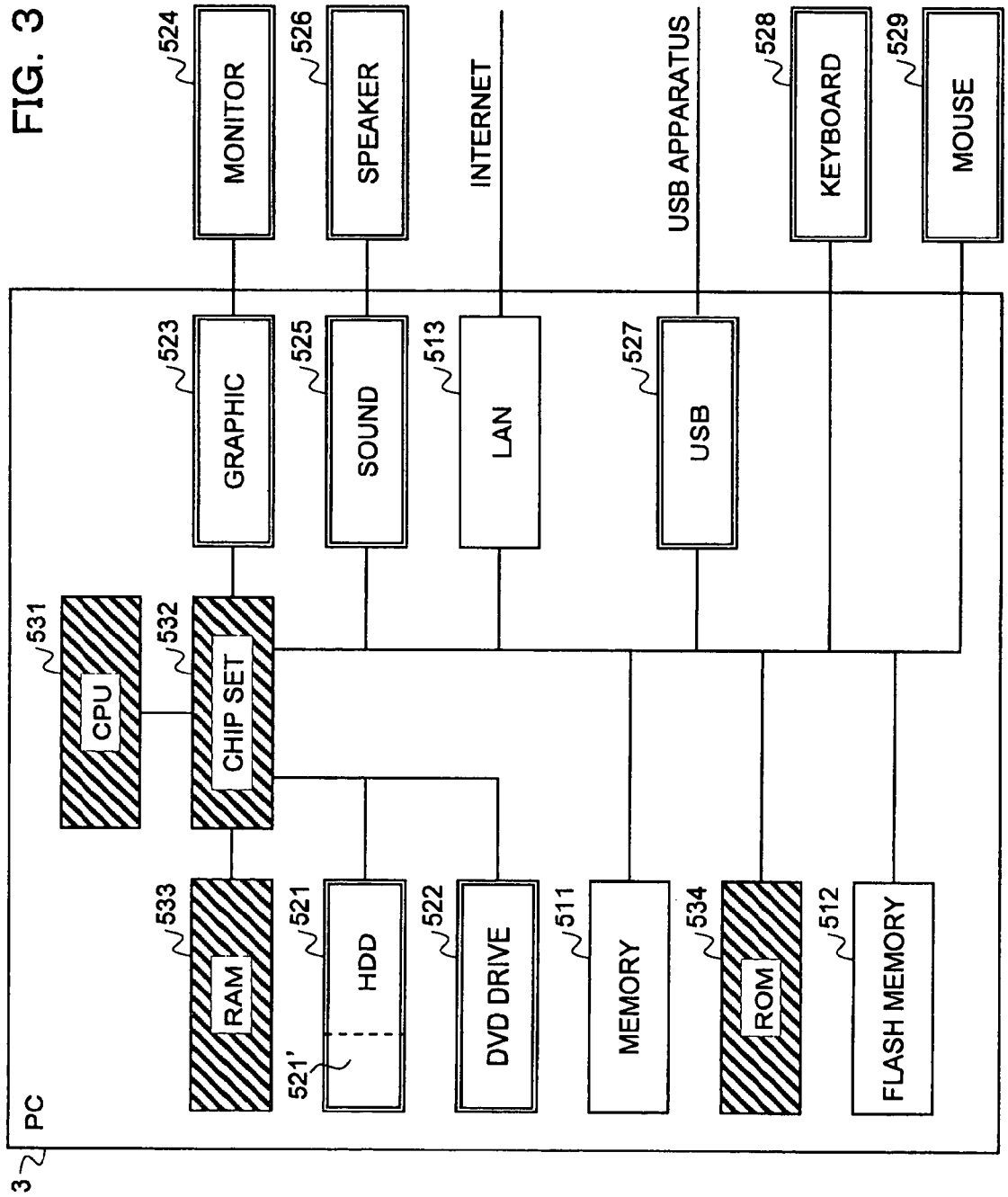
FIG. 3 is a diagram illustrating an example of a configuration of the grid processing control apparatus according to the embodiment.

FIGS. 2 and 3 are diagrams illustrating examples of configurations of the grid processing control apparatus 3 according to the embodiment. In particular, FIG. 2 illustrates hardware and software hierarchical configurations of the grid processing control apparatus 3. FIG. 3 illustrates a configuration of circuit blocks of the grid processing control apparatus 3.

The computer as the grid processing control apparatus 3 includes a hardware (in other words, a circuit block) 5, a grid OS (operating system) 6, a general-purpose OS 7, the grid application 8, and the general-purpose application 9.

The grid OS 6 is a special-purpose OS dedicated to grid computing. The general-purpose OS 7 is a general-purpose OS other than the grid OS 6, and is a well-known OS available on the market, for example. The grid application 8 is executed on the grid OS 6, and executes processing in the grid computing (grid processing). The general-purpose application 9 is an application other than the grid application 8. The general-purpose application 9 is executed on the general-purpose OS 7, and executes predetermined processing.

The general-purpose OS 7 includes, according to the embodiment, a normal-power-supply processing unit 71 and a suspension processing unit 72. Therefore, the general-purpose OS 7 in the embodiment has a configuration obtained by adding the normal-power-supply processing unit (a normal-power-supply processing routine) 71 and the suspension processing unit (a suspension processing routine) 72 to the well-known OS available on the market. These units are explained later.

The hardware 5 includes a grid base circuit 51 corresponding to the grid OS 6, a general-purpose circuit 52 corresponding to the general-purpose OS 7, and a basic circuit 53 common to the grid OS 6 and the general-purpose OS 7. The basic circuit 53 includes a BIOS (Basic Input/Output System) 535.

The grid base circuit 51 includes circuits or devices which is usable (or needed) for the grid processing control apparatus 3 to execute the grid application 8. In FIG. 3, the grid base circuit 51 includes circuits or devices (excluding circuits indicated by hatching) surrounded and indicated by single lines. That is, the grid base circuit 51 includes a memory 511, a flash memory 512, and a LAN (Local Area Network) 513. In other words, the grid base circuit 51 includes storage circuit and a communication circuit. The memory 511 is a memory other than a RAM 533 and the flash memory 512, and is a memory (a network storage) used by the LAN 513. The LAN 513 is not limited to this, and may be some communication (transmission and reception) circuit.

The general-purpose circuit 52 includes input and output circuits or devices of the computer as the grid processing control apparatus 3. In FIG. 3, the general-purpose circuit 52 includes circuits (or devices) surrounded and indicated by double lines. That is, the general-purpose circuit 52 includes a HDD 521, a DVD drive 522, a graphic (an image data processing circuit) 523, a monitor 524, a sound (a sound data processing circuit) 525, a speaker 526, a USB (a connecting unit) 527, a keyboard 528, and a mouse 529. These are user interfaces of the computer as the grid processing control apparatus 3.

The basic circuit 53 includes circuits which is needed for the grid processing control apparatus 3 to operate as a computer. In FIG. 3, the basic circuit 53 includes the circuits indicated by hatching. That is, the Basic circuit 53 includes a CPU 531, a chip set 532, a RAM 533, and a ROM 534. These are circuits which are at least needed for the element computer 3 to operate as a computer. The chip set 532 is a set of semiconductor devices (chips) forming the core of the computer together with the CPU 531, and includes a well-known south bridge, for example. The ROM 534 includes the BIOS 535.

As illustrated in FIG. 2, in the grid processing control apparatus according to the embodiment, the grid OS 6 and the general-purpose OS 7 are not simultaneously operated on the hardware 5. For this purpose, OS boot up unit is provided which allows selectively the grid OS 6 or the general-purpose OS 7 to operate. The OS boot up unit is the BIOS 535, for example. The BIOS 535 allows only the grid OS 6 to operate, during grid use term (or grid operation) which is a term the grid OS 6 is operated. And, the BIOS 535 allows only the general-purpose OS 7 to operate, during general-purpose OS use term (or general-purpose operation) which is a them the general-purpose OS 7 is operated. Therefore, the grid OS 6 and the general-purpose OS 7 are temporally switched such that only one of the grid OS 6 and the general-purpose OS 7 is booted up. Then, the grid OS 6 and the general-purpose OS 7 are exclusively operated.

During the grid use term, only the grid OS 6 is booted up. The grid OS 6 is set up by the BIOS 535. During the grid use term, only the grid OS 6 is operated on the hardware 5 of the element computer 3, and only the grid application 8 is operated on the grid OS 6. At this point, the general-purpose OS 7 is not operated at all, so that, in appearance, it looks as if only one grid OS 6 is present.

On the other hand, in a case other than the grid use term time (in other words, during the general-purpose OS use term), only the general-purpose OS 7 is booted up. During the general-purpose OS use term, only the general-purpose OS 7 is operated on the hardware 5 of the element computer 3, and only the general-purpose application 9 is operated on the general-purpose OS 7. At this point, the grid OS 6 is not operated at all, so that, in appearance, it looks as if only one general-purpose OS 7 is present.

As illustrated in FIG. 2, in the grid processing control apparatus according to the embodiment, a state of a power supply is switched in response to a switching of the grid OS 6 and the general-purpose OS 7. The state of the power supply corresponds to the grid use term and the general-purpose OS use term in a one-to-one relation. The BIOS 535 controls to supply power to only the basic circuit 53 and the grid base circuit 51, during the grid use term. And, the BIOS 535 controls to supply the power to the basic circuit 53, the grid base circuit 51, and the general-purpose circuit 52, during the general-purpose OS use term. Therefore, the state of the power supply is set in exclusive two states (a first state and a second state) of the power supply according to the switching of the grid OS 6 and the general-purpose OS 7, and is temporally switched.

The state of the power supply corresponding to the grid use term is the first state, and is "system power supply ON". A state of "system power supply OFF" is a state of "normal power supply ON". At the time of grid use term, in appearance (for a user), it looks as if the power supply for the computer as the grid processing control apparatus 3 is OFF. As described above, when the power supply is in the first state, the grid OS 6 is booted up by the BIOS 535.

The state of the power supply corresponding to the general-purpose OS use term is the second state, and is "normal power supply ON". A state of "normal power supply OFF" is a state of "system power supply ON". As described above, when the power supply is in the second state, the general-purpose OS 7 is booted up by the BIOS 535.

A state of "system power supply OFF" and "normal power supply OFF" is OFF of a power switch of the grid processing control apparatus 3. For example, the power switch is manually turned on and off by the user. Therefore, the system power supply (and ON and OFF thereof) may be considered the power switch (and ON and OFF thereof). The first state of the power supply may be considered ON of the power switch. The second state of the power supply may be considered shutdown of the general-purpose OS 7.

In the state of "system power supply ON", which corresponds to the grid use term, the power is supplied to only circuits which are needed for the grid OS 6 to operate. In other words, ON of the system power supply (the first state of the power supply) is a state of the power supply for supplying the power to only the circuits which are needed for the grid OS 6 to operate. Specifically, the power is supplied to only the grid base circuit 51 (and the basic circuit 53). Consequently, during the grid use term, it is possible to set circuits which are operated (the hardware 5) itself as a necessary minimum circuit (the grid base circuit 51), based on whether a circuit is a circuit which is needed for the grid computing, and to suppress power consumption. Further, it is possible to eliminate an influence of the grid OS 6 (and the grid computing system 4 via the grid OS 6) on circuits which are not operated actually, and then to improve security.

For example, a frequency of a clock of the CPU 531 during the grid use term may be set lower than a frequency of a clock of the CPU 531 during the general-purpose OS use term. Consequently, it is possible to suppress power consumption during grid use term.

In the state of "normal power supply ON", which corresponds to the general-purpose OS use term, the power is supplied to circuits which are needed for the general-purpose OS 7 to operate (therefore, all the circuits). In other words, ON of the normal power supply (the second state of the power supply) is a state of the power supply for supplying the power to the circuits which are needed for the general-purpose OS 7 to operate. Specifically, the power is supplied to all the circuits, i.e., the grid base circuit 51, the general-purpose circuit 52, and the basic circuit 53. Consequently, during the general-purpose OS use term, it is possible to use the circuits (the hardware 5) which are needed without any trouble, and perform processing.

The power is supplied to the basic circuit 53, in other words, the CPU 531, the chip set 532, the RAM 533, and the ROM 534 in both the cases of "system power supply ON" and "normal power supply ON".

As illustrated in FIG. 2, in the grid processing control apparatus 3 according to the embodiment, the BIOS 535 performs access restriction according to the switching of the grid OS 6 and the general-purpose OS 7. For example, the BIOS 535 restricts the grid OS 6 from accessing the entire general-purpose circuit 52 or at least a part of the general-purpose circuit 52, during the grid use term. On the other hand, the BIOS 535 does not restrict the general-purpose OS 7 from accessing the grid base circuit 51 and the general-purpose circuit 52, during the general-purpose OS use term.

For example, during the grid use term, it is restricted (or prohibited) to access by the grid OS 6 to the HDD 521 included in the general-purpose circuit 52. Therefore, the grid OS 6 does not access the HDD at all (in other words, does not have such a function). Alternatively, in the HDD 521, it may be restricted to access by the grid OS 6 to an area (section) 521' which is used by the general-purpose OS 7. In this case, the grid OS 6 does not access the area 521' at all. Therefore, during the grid use term, it is possible to prevent contamination of the general-purpose OS 7 (and an execution environment thereof) by a virus through the network 2, and to prevent outflow of information through the network 2.

As described above, the general-purpose OS 7 includes the normal-power-supply processing unit 71 and the suspension processing unit 72 in addition to the functions of the well-known OS. When the power supply is in the first state (when the normal power supply is in the OFF state), the general-purpose OS 7 requests the normal-power-supply processing unit 71 to perform predetermined processing. When the power supply is in the first state, the normal-power-supply processing unit 71 terminates an execution of the general-purpose OS 7, and notifies the BIOS 535 of the termination of the execution of the general-purpose OS 7. When the general-purpose OS 7 is in suspension, the general-purpose OS 7 requests the suspension processing unit 72 to perform predetermined processing. When the general-purpose OS 7 is in suspension, the suspension processing unit 72 performs suspension processing for the general-purpose OS 7, and notifies the BIOS 535 of the suspension.

The state of the suspension of the general-purpose OS 7 is decided by elapse of a time set in advance after the general-purpose OS 7 is booted up. The general-purpose OS 7 monitors the elapse of the time with a timer (not illustrated) which is provided in the CPU 531.

As described above, according to the embodiment, it is possible to separate an execution environment of the general-purpose OS 7 and an execution environment of the grid OS 6. The grid OS 6 is booted up by the BIOS 535 separately from the general-purpose OS 7. Similarly, it is also possible to separate an execution environment of the general-purpose application 9 and an execution environment of the grid application 8.

According to the embodiment, the grid OS 6 (and the general-purpose OS 7) is booted up by the BIOS 535, so that a configuration can be simplified, regardless of the fact that the execution environments of the general-purpose OS 7 and the grid OS 6 are separated. That is, it is not needed to provide a module (or middleware) or the like for managing the OSs between the hardware 5 and the two OSs (the general-purpose OS 7 and the grid OS 6).

Further, according to the embodiment, the grid OS 6 is always booted up according to turn-on of the power switch of the grid processing control apparatus 3. Thus, it is possible to use without waste a period in which the general-purpose OS 7 is not operated, for the grid processing, and to effectively utilize the computer resources.

Figure 4:
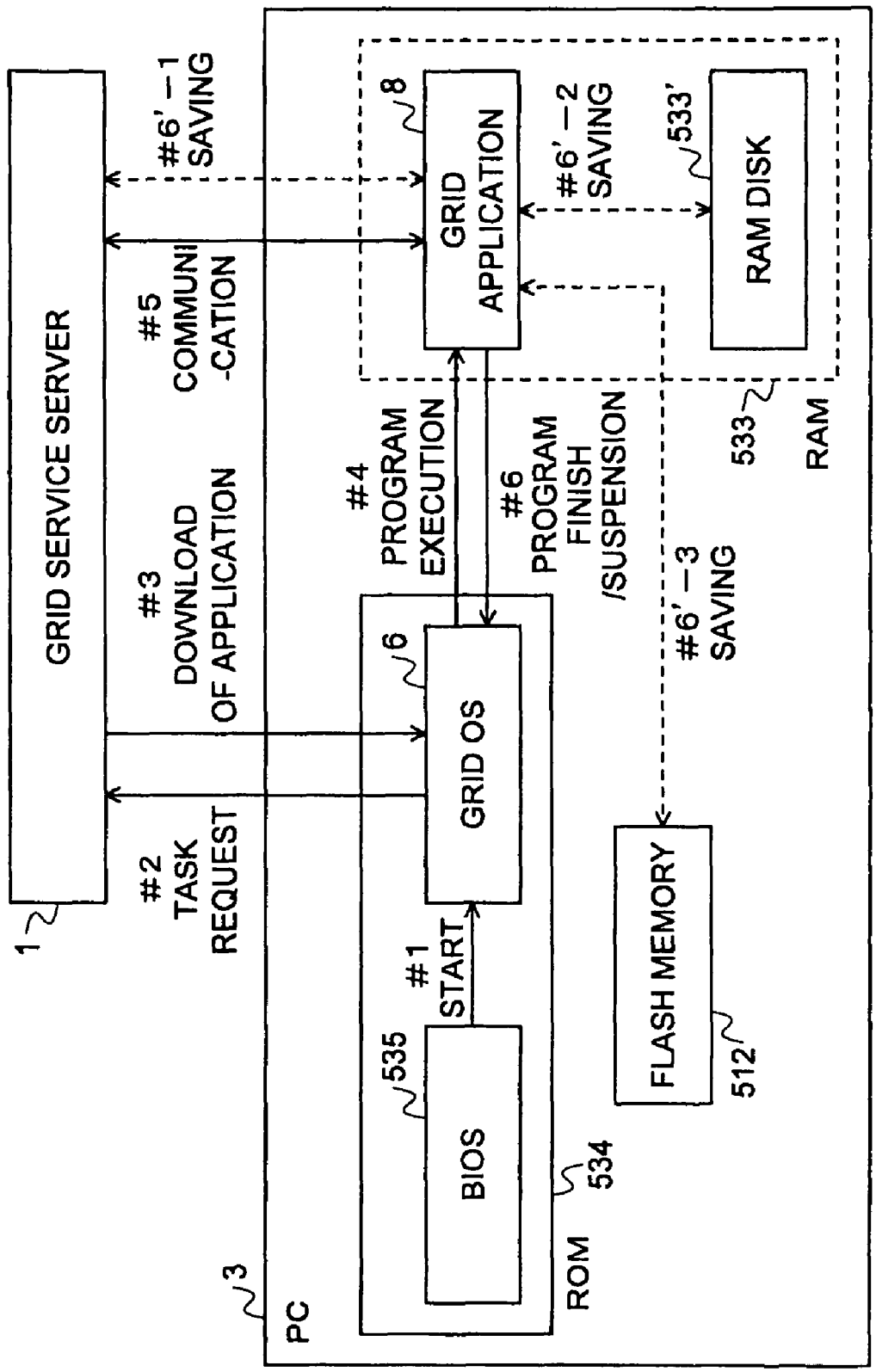
FIG. 4 is an explanatory diagram of the grid processing control apparatus according to the embodiment.

FIG. 4 is an explanatory diagram of the grid processing control apparatus according to the embodiment, and illustrates execution of the grid application 8 by the grid processing control apparatus 3.

When the power switch of the grid processing control apparatus 3 is turned on, the power supply changes to the first state (the state of system power supply ON). Then, the power is supplied to the basic circuit 53, and the BIOS 535 stored on the ROM 534 is executed. Thus, the grid OS 6 is booted up (#1). The booted up grid OS 6 requests a task to the grid service server 1 via the network 2 (#2). Then, the grid OS 6 downloads the grid application 8 from the grid service server 1 (#3), stores the grid application 8 on the RAM 533, and executes the grid application 8 (#4).

The grid application 8 is executed on the CPU 531 of the grid processing control apparatus 3. When the grid application 8 is downloaded, the grid application 8 is once stored on the RAM 533, and then stored on a main memory which is a part of the RAM 533, during execution. The RAM 533 may be a RAM disk 533' or other storages.

In a process of the execution of the grid application 8, the grid application 8 performs communication which is needed with the grid service server 1 (#5), and executes its processing using a response obtained from the grid service server 1.

In order to finish or stop the processing of the downloaded grid application 8, the grid application 8 finishes (terminates) or stops (discontinues) the processing at that time, and notifies the grid OS 6 of the finish or the stop of the processing (#6). In a case of the finish or the stop of the processing, the grid application 8 saves data that needs to be saved according to the finish or the stop (saving data) in the grid service server 1 via the network 2 (#6'-1). When the grid application 8 fails to save the data, the saving data is discarded. The saving data is saved as a log, for example, in the grid service server 1.

The stop of the processing of the grid application 8 occurs when the execution of the general-purpose OS 7 is booted up during the processing to be stopped. Specifically, the stop of the processing of the grid application 8 occurs when the execution of the general-purpose OS 7 is instructed and inputted by the user and the computer as the grid processing control apparatus 3 is booted up, in other words, when use of an environment of the general-purpose OS 7 is booted up.

The grid OS 6 (or the grid application 8) may save the saving data in a memory provided exclusively for the grid OS 6. For example, the grid OS 6 may save the saving data in the RAM disk 533' (#6'-2). Further, the grid OS 6 may save the saving data in the flash memory 512 (#6'-3). These operations for saving data are performed, for example, when the RAM disk 533' or the flash memory 512 is provided as a memory dedicated to the grid OS 6. In this case, the downloaded grid application 8 may be saved in the RAM disk 533' or the flash memory 512.

Figure 5:
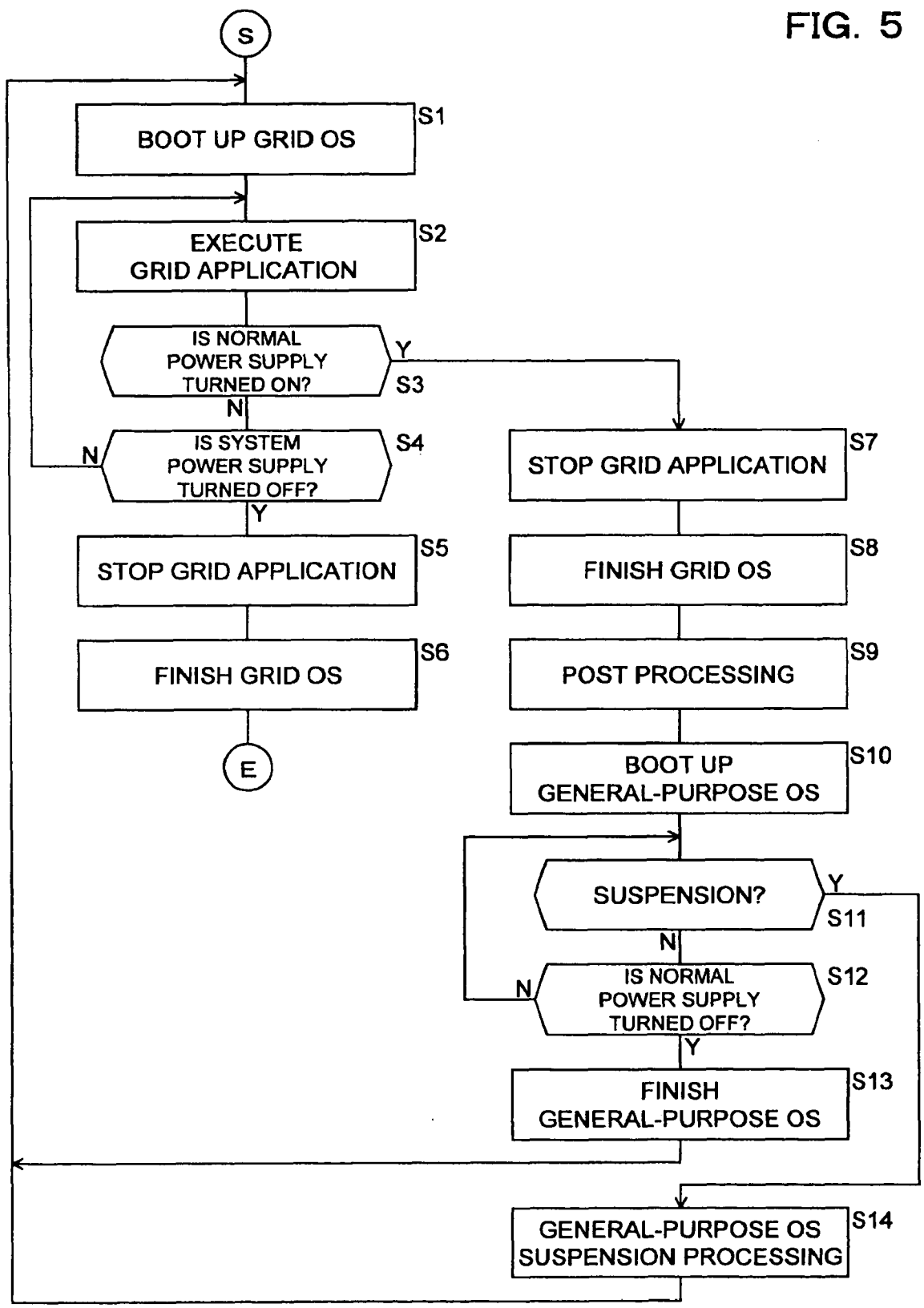
FIG. 5 is a processing flowchart illustrating control processing of grid processing executed by the grid processing control apparatus according to the embodiment.
Figure 6A:
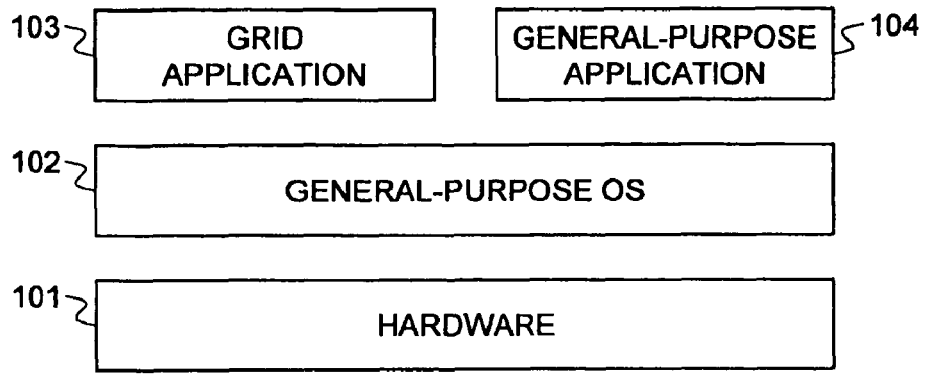
FIGS. 6A and 6B are an explanatory diagram of a conventional grid processing control apparatus.
Figure 6B:
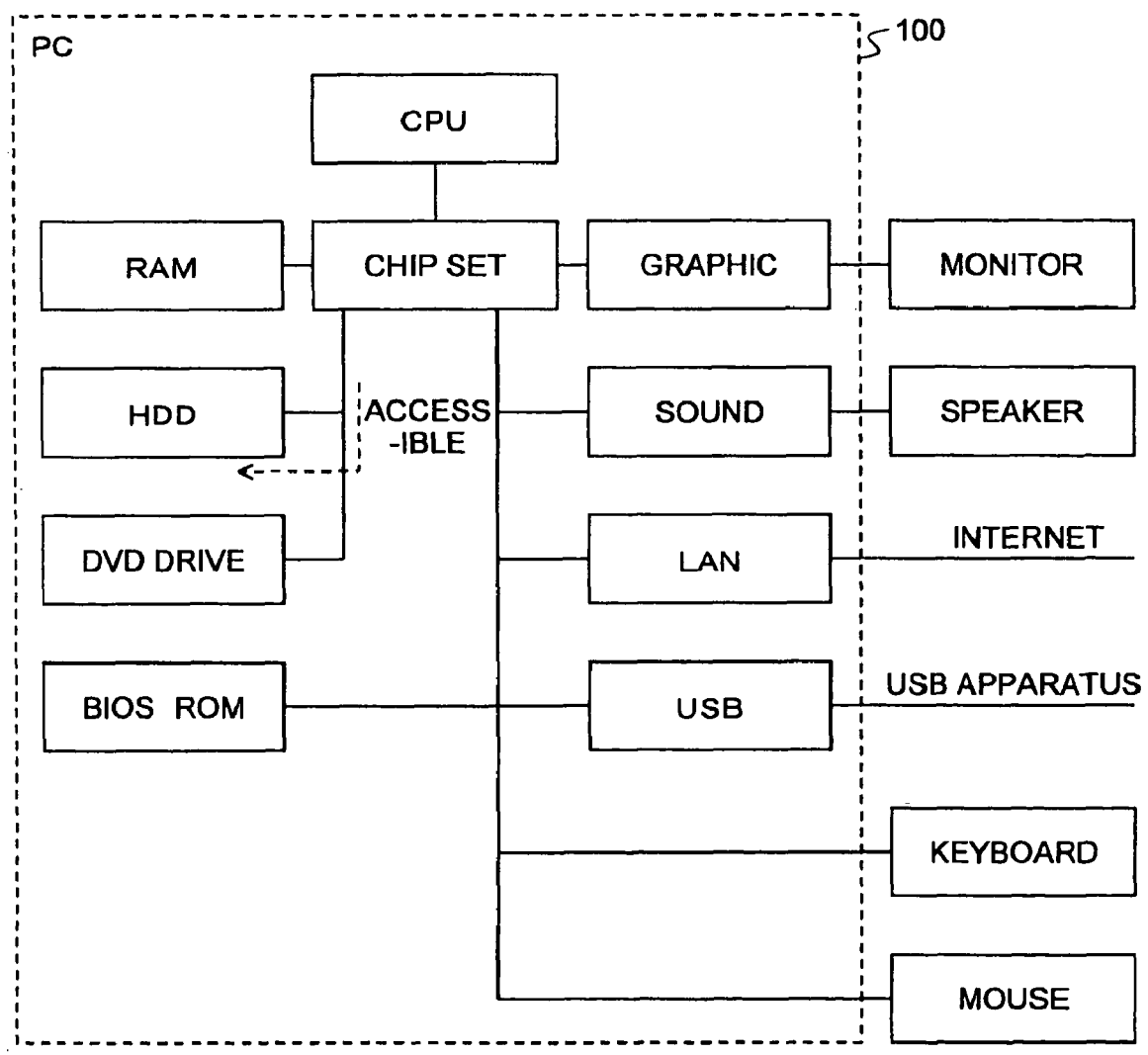

FIG. 5 is a grid processing control flowchart executed by the grid processing control apparatus according to the embodiment.

The system power supply changes to the ON state (the power supply changes to the first state) according to the turn-on of the power switch of the computer as the grid processing control apparatus 3. Then, the BIOS 535 of the computer 3 boots up the grid OS 6 (step S1). The booted up grid OS 6 downloads an appointed grid application 8 from the grid service server 1, and executes the grid application 8 (step S2).

In this state, the grid OS 6 checks whether the normal power supply changes to the ON state (the power supply changes to the second state) (step S3). When the normal power supply is not ON (is OFF), in other words, the power supply is not in the second state, the grid OS 6 further checks whether the system power supply changes to the OFF state (the power switch of the grid processing control apparatus 3 changes to the OFF state) (step S4). When the system power supply is not in the OFF state (is ON), the grid OS 6 executes the step S2. Consequently, the execution of the grid application 8 under execution is continued. When the system power supply is in the OFF state, the grid OS 6 stops the execution of the grid application 8 under execution (step S5), and finishes (terminates) the booted up grid OS 6 (step S6). This operation is performed when the power switch of the grid processing control apparatus 3 is turned off by the user. In the step S5, saving data is saved in the grid service server 1.

In the step S3, when the normal power supply is ON (changes to ON), in other words, the power supply is in the second state, the grid OS 6 stops the execution of the grid application 8 under execution (step S7), and finishes the booted up grid OS 6 (step S8). That is, the booted up grid OS 6 executes the grid application 8, and, when the power supply is in the second state, stops the execution of the grid application 8 under execution, and finishes the execution of the grid OS 6. This operation is performed when the execution of the general-purpose OS 7 is instructed by the user. Therefore, the grid OS 6 includes a function or means for checking a state of the power supply and finishing the execution of the grid application 8 and the grid OS 6 according to a result of the check. In the step S7, the saving data is saved in the grid service server 1.

Thereafter, the BIOS 535 executes POST processing (step S9). The POST processing is processing (pre-processing) which is needed for booting up the general-purpose OS 7, and is well-known processing. For example, according to the POST processing, states of the CPU 531, the chip set 532, the RAM 533, and the like are set in initial states.

Thereafter, the BIOS 535 boots up the general-purpose OS 7 (step S10). Specifically, when the power supply is in the second state, the BIOS 535 boots up the general-purpose OS 7 after the execution of the grid OS 6 is finished. The booted up general-purpose OS 7 executes a predetermined general-purpose application 9 which is loaded and present on the RAM 533, for example. In parallel to the execution of the general-purpose application 9, the booted up general-purpose OS 7 checks whether the general-purpose OS 7 itself is in suspension (step S11). Therefore, the booted up general-purpose OS 7 executes the general-purpose application 9, performs the suspension processing for the general-purpose OS 7 when the general-purpose OS 7 itself is in suspension, and finishes the execution of the general-purpose OS 7 when the power supply is in the first state.

When the general-purpose OS 7 is not in suspension, the general-purpose OS 7 further checks whether the normal power supply is in the OFF state (step S12). When the normal power supply is not in the OFF state, the general-purpose OS 7 executes the step S11. Then, the execution of the general-purpose OS 7 under execution is continued. When the normal power supply is in the OFF state, the general-purpose OS 7 requests the normal-power-supply processing unit 71 to terminate the processing of the general-purpose OS 7 itself (step S13), and notifies the BIOS 535 of the finish of the processing. According to the notification, the BIOS 535 executes the step S1. In the step S13, when data that needs to be saved is present, the data is saved in a predetermined saving area prior to the finish of the processing.

In the step S11, when the general-purpose OS 7 itself is in suspension, the general-purpose OS 7 requests the suspension processing unit 72 to execute suspension processing for the general-purpose OS 7 (step S14), and notifies the BIOS 535 of the suspension. According to the notification, the BIOS 535 executes the step S1. Therefore, the BIOS 535 boots up the grid OS 6 after the suspension processing or after the execution of the general-purpose OS 7 is finished. In the step S14, when data that needs to be saved is present, the data is saved in the predetermined saving area as a part of the suspension processing.

As described above, according to the embodiment, in the grid processing control apparatus, the grid OS and the general-purpose OS are not simultaneously operated, during the grid use term. Therefore, it is possible to prevent the grid processing control apparatus from being affected by a health state of the grid computing system. The power is not supplied to all the circuit to make the circuits operable, during the grid use term. Therefore, it is possible to save power consumption of the grid processing control apparatus, during the grid use term. Further, access restriction can be realized on the grid OS, during the grid use term. Therefore, in the grid processing control apparatus, it is possible to prevent the general-purpose OS and the general-purpose application from being manipulated, and prevent information of the general-purpose application from flowing out.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the sprit and scope of the invention.

What is claimed is:

1. A grid processing control apparatus comprising:
   a grid OS being an OS dedicated to grid computing;
   a general-purpose OS being an OS other than the grid OS;
   an OS boot up unit selectively allowing the grid OS or the general-purpose OS to operate, the OS boot up unit allowing only the grid OS to operate during a grid use term when the grid OS is operated and allowing only the general-purpose OS to operate during a general-purpose OS use term when the general-purpose OS is operated; and
   a circuit block including a grid base circuit corresponding to the grid OS, a general-purpose circuit corresponding to the general-purpose OS, and a basic circuit common to the grid OS and the general-purpose OS, and
   wherein the OS boot up unit supplies power to only the basic circuit and the grid base circuit during grid use term, and supplies the power to the basic circuit, the grid base circuit, and the general-purpose circuit during general-purpose OS use term.

2. The grid processing control apparatus according to claim 1, wherein the grid base circuit further comprises a circuit which is usable by the grid processing control apparatus to execute a grid application, the general-purpose circuit further comprises an input and output circuit of a computer which is the grid processing control apparatus, and the basic circuit further comprises a circuit which is needed for the grid processing control apparatus to operate as a computer.

3. The grid processing control apparatus according to claim 1, wherein the OS boot up unit restricts access to at least a part of the general-purpose circuit by the grid OS during the grid use term, and does not restrict access to the grid base circuit and the general-purpose circuit by the general-purpose OS during the general-purpose OS use term.

4. The grid processing control apparatus according to claim 3, wherein the OS boot up unit restricts access by the grid OS to a HDD included in the general-purpose circuit or to an area used by the general-purpose OS in the HDD during the grid use term.

5. The grid processing control apparatus according to claim 1, wherein the OS boot up unit comprises a BIOS provided in a ROM included in the basic circuit, and, when a power supply is in a first state, the BIOS boots up the grid OS.

6. The grid processing control apparatus according to claim 1, wherein, when a power supply is in a first state, the OS boot up unit boots up the grid OS, and the booted up grid OS executes a grid application, and
   wherein, when the power supply is in a second state, the OS boot up unit stops the execution of the grid application and finishes the execution of the grid OS, and the OS boot up unit boots up the general-purpose OS after the finish of the execution of the grid OS.

7. The grid processing control apparatus according to claim 6, wherein the booted up grid OS downloads a grid application from a grid service server to which the grid processing control apparatus is connected via a network, and executes the grid application.

8. The grid processing control apparatus according to claim 7, wherein the grid OS saves data of the grid application of which the execution is stopped in a memory provided exclusively for the grid service server or the grid OS.

9. The grid processing control apparatus according to claim 6, wherein the first state of the power supply is decided according to a state of a power switch of the grid processing control apparatus, and the second state of the power supply is decided according to instruction inputted to the grid processing control apparatus or elapse of a time set in advance after the power supply changes to the first state.

10. The grid processing control apparatus according to claim 6, wherein the booted up general-purpose OS executes a general-purpose application, performs suspension processing for the general-purpose OS when the general-purpose OS is in suspension, and finishes the execution of the general-purpose OS when the power supply is in the first state, and
    wherein the OS boot up unit boots up the grid OS after the suspension processing or after the finish of the execution of the general-purpose OS.

11. The grid processing control apparatus according to claim 10, wherein suspension of the general-purpose OS is decided by elapse of a time set in advance after the general-purpose OS is booted up.

12. The grid processing control apparatus according to claim 10, wherein the general-purpose OS further comprises a normal-power-supply processing unit that finishes the execution of the general-purpose OS when the power supply is in the first state.

13. The grid processing control apparatus according to claim 10, wherein the general-purpose OS further comprises a suspension processing unit that performs the suspension processing for general-purpose OS when the general-purpose OS is in suspension.

14. A grid processing control apparatus comprising:

a grid OS being an OS dedicated to grid computing;

a general-purpose OS being an OS other than the grid OS;

an OS boot up unit selectively allowing the grid OS or the general-purpose OS to operate, the OS boot up unit allowing only the grid OS to operate during a grid use term when the grid OS is operated and allowing only the general-purpose OS to operate during a general-purpose OS use term when the general-purpose OS is operated; and a circuit block including a grid base circuit corresponding to the grid OS, a general-purpose circuit corresponding to the general-purpose OS, and a basic circuit common to the grid OS and the general-purpose OS, and wherein the OS boot up unit restricts access to at least a part of the general-purpose circuit by the grid OS during the grid use term, and does not restrict access to the grid base circuit and the general-purpose circuit by the general-purpose OS during the general-purpose OS use term.

15. The grid processing control apparatus according to claim 14, wherein the OS boot up unit restricts access by the grid OS to a HDD included in the general-purpose circuit or to an area used by the general-purpose OS in the HDD during the grid use term.

* * * * *